R. S. STRAHAN.
MUFFLER.
APPLICATION FILED FEB. 14, 1912.
1,041,190.
Patented Oct. 15, 1912.
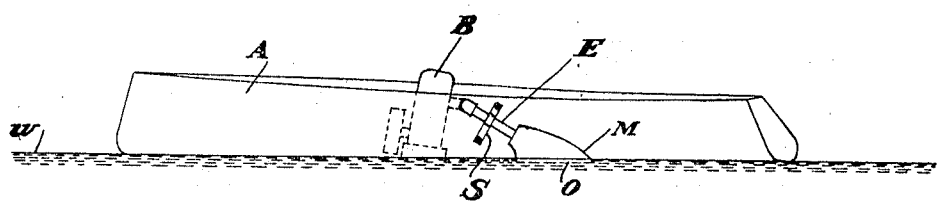
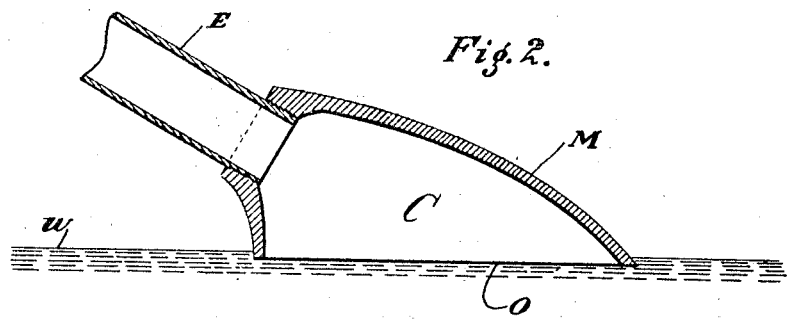
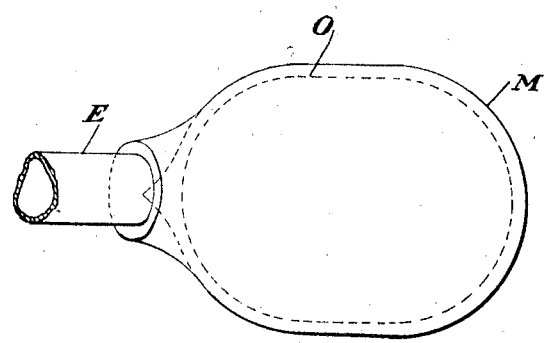
WITNESSES:
James H. Browne
Robert M. Synes
INVENTOR
R. Sheldon Strahan

UNITED STATES PATENT OFFICE.

ROBERT SHELDON STRAHAN, OF BROOKLYN, NEW YORK.

MUFFLER.

1,041,190.  Specification of Letters Patent.  Patented Oct. 15, 1912.

Application filed February 14, 1912. Serial No. 677,508.

*To all whom it may concern:*

Be it known that I, ROBERT SHELDON STRAHAN, a citizen of the United States, residing at 23 South Elliott Place, Brooklyn, in the county of Kings and State of New York, have invented a new and useful Mufflers of which the following is a specification.

My invention relates to motor boat mufflers; and the objects of my invention are, first, to increase the efficiency of motor boat engines by exhausting the burnt gases into a chamber containing a partial vacuum; and second, to muffle or deaden the sound of the exhaust from the engine. I attain these objects by the mechanism illustrated in the accompanying drawing, in which—

Figure 1 is a view of a motor boat showing the muffler attached to the end of the exhaust pipe of its engine; Fig. 2, is a vertical section of the muffler and shows the relation of the open end of the muffler to the surface of the water; and Fig. 3, is a plan of the muffler.

Similar letters refer to similar parts throughout the several views.

The motor boat A, its engine B, and the exhaust pipe E, the funnel shaped chamber M, with its open end O, slightly below the surface of the water w, thereby forming a muffler, constitute the features necessary to effect an increase in the efficiency of the engine B, referred to hereinafter.

The exhaust pipe E, is held in place by the strap S, fastened to the side of the motor boat A.

To the end of the exhaust pipe E, Fig. 2, is screwed the funnel shaped chamber M, forming the chamber C, and so placed that its open end O, is slightly below the surface of the water w, with the plane of the said open end O, parallel to the surface of the water w.

It is readily seen that when the motor boat A, is in motion and the open end O, of the funnel shaped chamber M, passes across the surface of the water w, a partial vacuum is formed in the chamber C. It is the object of my invention to thus relieve the engine B, of exhausting against full atmospheric pressure by providing the chamber C, at the end of the exhaust pipe E, as described, constituting the means of increasing the efficiency of the engine B, previously referred to.

The causing of the exhaust gases of the engine B, to discharge below the surface of the water w, by means of the funnel shaped chamber M, reduces the sound due to these gases to a minimum.

I am aware that the principle of passing a liquid rapidly across the open end of a chamber containing a gas and thereby causing a partial vacuum to be formed in the said chamber is an old physical principle, but I am not aware that this principle has been applied to the exhaust pipe of a motor boat engine as herein specified. I am also aware that chambers placed at the end of exhaust pipes entirely below the surface of the water, and with their open ends perpendicular to the surface of the water, are used as mufflers, but I am not aware that a funnel shaped chamber placed entirely above the surface of the water with its open end parallel and adapted to come slightly below the surface of the water, has been used as a muffler.

I claim:

1. A funnel shaped chamber attached to the end of an exhaust pipe of a motor boat engine, the open end of the said chamber adapted to rest slightly below the surface of water whereby a partial vacuum is formed therein, substantially as set forth.

2. A funnel shaped chamber M, attached to the end of a motor boat engine exhaust pipe E, and adapted to pass across the surface of water, and thereby form a muffler, substantially as shown and for the purpose specified.

3. A funnel shaped chamber attached to the end of a motor boat engine exhaust pipe with the open end of the said funnel shaped chamber adapted to rest slightly below the surface of water, and the plane of the said open end parallel to the surface thereof, substantially as described.

R. SHELDON STRAHAN.

Witnesses:
 ROBERT M. SQUIRE,
 JAMES H. BROWNE.